United States Patent [19]

Komurasaki

[11] Patent Number: 4,959,993

[45] Date of Patent: Oct. 2, 1990

[54] ACCELERATION DETECTOR

[75] Inventor: Satosi Komurasaki, Himeji, Japan

[73] Assignee: Mitsubishi Denki Kabushiki Kaisha, Tokyo, Japan

[21] Appl. No.: 364,043

[22] Filed: Jun. 9, 1989

[30] Foreign Application Priority Data

Jun. 10, 1988 [JP] Japan ............................. 63-76289[U]
Jun. 22, 1988 [JP] Japan ................................. 63-152422

[51] Int. Cl.⁵ .......................................... G01H 11/08
[52] U.S. Cl. ......................................... 73/35; 310/329
[58] Field of Search ....................... 73/35, 654; 310/329

[56] References Cited

U.S. PATENT DOCUMENTS 3,487,238 12/1969 Angleton et al. .................... 310/329
4,225,302 9/1980 Suzuki et al. ....................... 310/329

FOREIGN PATENT DOCUMENTS 59-99323 6/1984 Japan ...................................... 73/35

Primary Examiner—John Chapman
Attorney, Agent, or Firm—Sughrue, Mion, Zinn, Macpeak & Seas

[57] ABSTRACT

An acceleration detector comprising transducer including a pair of ring-shaped piezoelectric elements, a terminal having a ring-shaped eye portion for taking out an output from the piezoelectric elements and a weight for applying a stress to the piezoelectric elements in response to an acceleration applied to the detector. The transducer is mounted on a base having a threaded hole by a screw having a threaded portion thread-engaged with the threaded hole of the base. The axial length of the threaded portion of the screw is selected such that its substantially entire length engages the threaded hole in order not to damage an electrically insulating tube placed over the screw by the thread on the screw. The threaded hole in the base may have a counter sink for providing a predetermined dimensional allowance in the relationship between the axial length of the threaded portion and the depth of the thread hole. Also, the terminal may have a bent tab at the outer circumference of the ring-shaped eye portion for engaging the outer circumferential surface of at least one of the piezoelectric elements to prevent the terminal from being displaced relative to the piezoelectric elements.

4 Claims, 3 Drawing Sheets

ACCELERATION DETECTOR

BACKGROUND OF THE INVENTION

This invention relates to an acceleration detector and more particularly to an acceleration detector which includes an acceleration transducer secured to a base by a screw.

FIGS. 1 and 2 illustrate one example of the conventional acceleration detector disclosed in Japanese U.M. Publication No. 60-23730. In the figures, the conventional acceleration detector comprises a housing 1 made of a conductive material. The housing comprises a base 1a which has at its bottom a thread 1b for securing the housing 1 to an article (not shown), such as an internal combustion engine, of which acceleration or vibration upon knocking is to be detected. The housing 1 also comprises a cylindrical wall 1c defining therein a cavity for receiving therein an acceleration detecting transducer 10. The transducer 10 comprises a pair of ring-shaped piezoelectric elements 2 sandwiching a ring-shaped terminal 3 shown in FIG. 2 therebetween. The terminal 3 is made of a sheet of phosphor bronze and has a ring or an eye portion 3a having a circular opening 3b and a radially outwardly extending tab 3c having a small hole 3d for connecting one end of a lead wire 7 for supplying an electrical signal from the piezoelectric elements 2. The piezoelectric elements 2 and the terminal 3 are placed on the inner bottom surface of the base 1a. A cylindrical inertial weight 4 having a central bore is stacked on the piezoelectric element 2. The transducer assembly of these elements 2, 3 and 4 are secured to the base 1a of the housing 1 by a mounting screw 5. It is seen that a threaded portion 5a of the screw 5 is thread-engaged into a threaded hole 1d of the base 1a and that a head 5b presses the weight 4 against the piezoelectric elements 2. In order to electrically insulate the piezoelectric elements 2 and the terminal 3 from the mounting screw 5, an electrically insulating tube 6 made of polyethylene is placed over the threaded portion 5a of the mounting screw 5. The thickness of the terminal 3 may be 0.1 mm–0.2 mm and the thickness of the insulating tube 6 may be 0.2 mm–0.3 mm. The remaining portion of the cavity defined within the housing 1 is filled with an electrically insulating semi-solid resin 8.

When in use, the acceleration detector is securely mounted on an internal combustion engine (not shown) for example by threaded bolt 1b of the housing 1. The acceleration or the vibration of the internal combustion engine produces the movement of the inertial weight 4 relative to housing 1, which causes the piezoelectric elements 2 to be stressed by the inertial weight 4, whereby an electrical signal indicative of the movement of the inertial weight 4 relative to the engine is generated from the piezoelectric elements 2. The electrical signal is provided through the washer terminal 3 and the lead 7 to be analyzed to determine as to whether or not a knocking signal which is generated upon knocking of the internal combustion engine is present. When it is determined that a knocking signal is contained in the electrical signal, the operating parameters for operating the engine can be adjusted to increase the output power or decrease the fuel consumption rate.

During the assembly of the acceleration detector of the above-construction, it is often occurs that the lead wire 7 is pulled in the direction of an arrow A when the bolt 1b is to be thread engaged into the engine (not shown). Then, the terminal 3 connected to the lead wire 7 is pulled in the radial direction and is displaced relative to the piezoelectric elements 2, causing the insulating tube 6 to be cut between the inner edge of the ring portion 3a of the terminal 3 and the ridges of the thread 5a of the screw 5. When the insulating tube 6 is broken and the terminal 3 is brought into contact with the mounting screw 5, the piezoelectric elements 2 are short-circuited and no output signal is provided.

Also, since the axial length of the threaded portion 5a is unnecessarily long and extends not only within the threaded hole in the base 1a but also over the bolt stem portion and extends completely through the insulating tube 6 and partly through the inertial weight 4, additional time and cost for forming unnecessary thread are needed.

SUMMARY OF THE INVENTION

Accordingly, one object of the present invention is to provide an acceleration detector free from the above-discussed problems of the conventional acceleration detector.

Another object of the present invention is to provide an acceleration detector in which the insulating tube electrically insulating the piezoelectric elements and the output terminal from the mounting screw is prevented from being damaged by the thread ridges of the threaded portion of the mounting screw.

Another object of the present invention is to provide an acceleration detector in which the unnecessary cost and time for thread forming are eliminated.

A further object of the present invention is to provide an acceleration detector in which the undesirable displacement of the output terminal relative to the piezoelectric elements which often causes damage to the insulating tube is eliminated.

With the above objects in view, the acceleration detector of the present invention comprises an acceleration detecting transducer including a pair of ring-shaped piezoelectric elements, a terminal having a ring-shaped eye portion for taking out an output from the piezoelectric elements and a weight for applying stress to the piezoelectric elements in response to an acceleration applied to the detector. The transducer is mounted on a base having a threaded hole by a screw having a threaded portion thread-engaged with the threaded hole of the base. The axial length of the threaded portion of the screw is selected such that its substantially entire length engages the threaded hole in order not to damage an electrically insulating tube placed over the screw by the thread on the screw.

The threaded hole in the base may have a counter sink for providing a predetermined dimensional allowance in the relationship between the axial length of the threaded portion and the depth of the thread hole. Also, the terminal may have a bent tab at the outer circumference of the ring-shaped eye portion for engaging the outer circumferential surface of at least one of the piezoelectric elements to prevent the terminal from being displaced relative to the piezoelectric elements.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
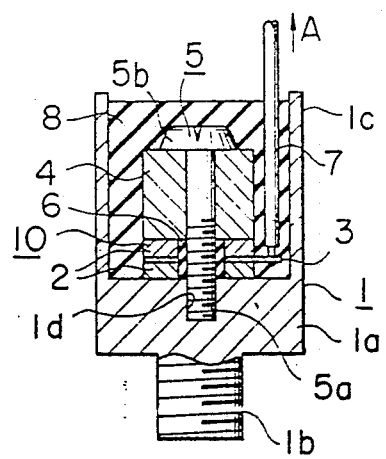
FIG. 1 is a sectional side view of the conventional acceleration detector.
Figure 2:
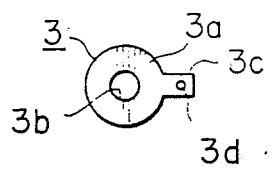
FIG. 2 is a plan view of the output terminal shown in FIG. 1.
Figure 3:
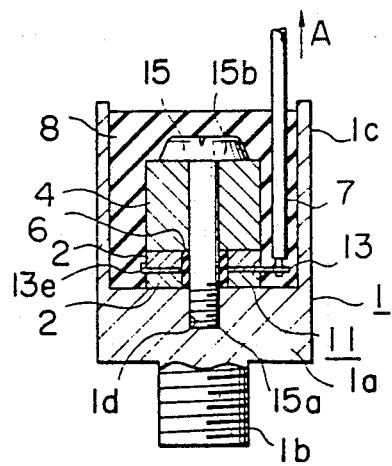
FIG. 3 is a sectional side view of the acceleration detector of the present invention.
Figure 4:
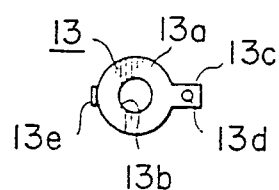
FIG. 4 is a plan view of the output terminal shown in FIG. 3.
Figure 5:
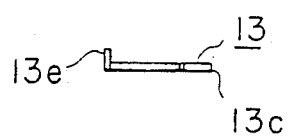
FIG. 5 is a side view of the output terminal shown in FIG. 3.

FIGS. 3 to 5 illustrate one embodiment of the acceleration detector constructed in accordance with the present invention. In the figures, it is seen that the basic structure of the acceleration detector of the present invention is the same as that of the conventional design shown in and described in conjunction with FIGS. 1 and 2. That is, the acceleration detector of the present invention comprises a housing 1 made of a conductive material. The housing comprises a base 1a which has at its bottom a thread 1b for securing the housing 1 to an article, such as an internal combustion engine (not shown) of which acceleration or vibration upon knocking for example, is to be detected. The housing 1 also comprises a cylindrical wall 1c defining therein a cavity for receiving therein an acceleration detecting transducer 11.

The transducer 11 comprises a pair of ring-shaped piezoelectric elements 2 sandwiching a ring-shaped terminal 13 shown in more detail in FIGS. 4 and 5 therebetween. The terminal 13 is made of a sheet of phosphor bronze and has a ring or an eye portion 13a having a circular opening 13b and a radially outwardly extending tab 13c having a small hole 13d for connecting one end of a lead wire 7 for supplying an electrical signal from the piezoelectric elements 2. The piezoelectric elements 2 and the terminal 13 are placed on the inner bottom surface of the base 1a of the housing 1. A cylindrical inertial weight 4 having a central bore is stacked on the piezoelectric element 2. The transducer assembly 11 of these elements 2, 13 and 4 is secured to the base 1a of the housing 1 by a mounting screw 15. It is seen that a threaded portion 15a of the screw 15 is thread-engaged into a threaded hole 1d of the base 1a and that a head 15b presses the weight 4 against the piezoelectric elements 2. In order to electrically insulate the piezoelectric elements 2 and the terminal 13 from the mounting screw 15, an electrically insulating tube 6 made of polyethylene or a fluorocarbon resin is placed over the threaded portion 15a of the mounting screw 15. The thickness of the terminal 13 may be 0.1 mm–0.2 mm and the thickness of the insulating tube 6 may be 0.2 mm–0.3 mm. The remaining portion of the cavity defined within the housing 1 is filled with an electrically insulating semi-solid resin 8.

According to the present invention, the terminal 13 is provided at its outer periphery of the eye portion 13a with a small tab 13e substantially vertically extending therefrom relative to a plane of the eye portion 13a. In the illustrated embodiment, the tab 13e is an integral member formed by bending a small radial projection of the eye portion 13a. The bent tab 13e at the outer circumference of the ring-shaped eye portion 13a engages the outer circumferential surface of at least one of the piezoelectric elements 2 as best seen in FIG. 3 and prevents the output terminal 13 from being displaced relative to the piezoelectric elements 2 even when a pulling force is applied to the output terminal 13. Thus, when the terminal 13 is pulled in the radial direction, the pull is transmitted to one of the piezoelectric elements 2 which have relatively large contact surface with respect to the mounting screw 15, and therefore the insulating tube 6 is prevented from being damaged by the relatively thin edge of the eye portion 13a of the terminal 13.

When in use, the acceleration detector is securely mounted on an internal combustion engine (not shown) for example by threaded bolt 1b of the housing 1. The acceleration or the vibration of the internal combustion engine produces the movement of the inertial weight 4 relative to the housing 1, which causes the piezoelectric elements 2 to be stressed by the inertial weight 4, whereby an electrical signal indicative of the movement of the inertial weight 4 relative to the engine is generated from the piezoelectric elements 2. The electrical signal is provided through the washer terminal 13 and the lead 7 to be analyzed to determine as to whether or not a knocking signal which generetes upon knocking of the internal combustion engine is involved. When it is determined that a knocking signal is contained in the electrical signal, the operating parameters for operating the engine can be adjusted to increase the output power or decrease the fuel consumption rate.

Also according to the present invention, the mounting screw 15 has a threaded portion 15a which has an axial length substantially equal to or slightly longer than the depth of the threaded hole 1d in the base 1a. In other words, the axial length of the threaded portion 15a of the mounting screw 15 is selected such that the substantially entire length of the threaded portion 15a engages the threaded hole 1d of the base 1a in order not to damage an electrically insulating tube 6 placed over the screw 15 by the threaded portion 15a on the screw 15.

Figure 6:
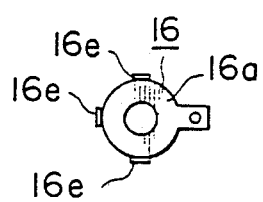
FIG. 6 is a plan view of the output terminal similar to that shown in FIG. 4 but illustrating another form of the output terminal.
Figure 7:
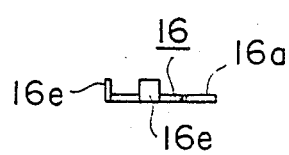
FIG. 7 is a side view of the output terminal shown in FIG. 6.

FIGS. 6 and 7 illustrate another embodiment of the output terminal 16 of the present invention in which the output terminal 16 is provided with three bent tabs 16e similar to the bent tab 13e of the terminal 13 shown in FIGS. 4 and 5 at equal intervals on the outer periphery of the ring-shaped eye portion 16a. In other respects, the terminal 16 is similar to that shown in FIGS. 4 and 5. This output terminal 16 is prevented from being moved in three lateral directions relative to the piezoelectric elements 2.

Figure 8:
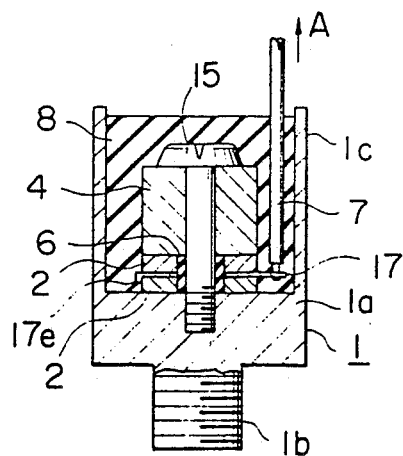
FIG. 8 is a sectional side view of the acceleration detector of another embodiment of the present invention.
Figure 9:
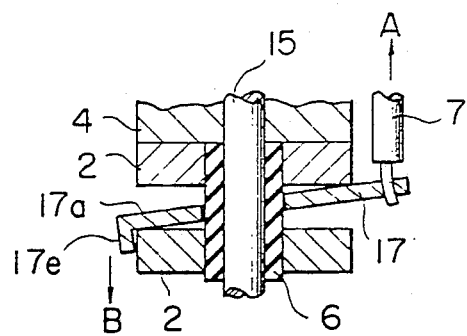
FIG. 9 is a fragmental enlarged view showing the manner in which the displacement of the output terminal of shown in FIG. 8 relative to the piezoelectric elements is prevented.

FIGS. 8 and 9 illustrate another modification of the output terminal 17 of the present invention in which the output terminal 17 has at least one bent tab 17e similar to the bent tabs shown in FIGS. 3–7 but bent downwardly as viewed in the figure from the outer periphery of the eye portion 17a of the terminal 17. In other respects, the output terminal 17 is similar to the previously described output terminals. As seen from FIG. 9, this embodiment is particularly effective when the lead wire 7 is pulled upwardly because the downwardly extending bent tab 17e is firmly engaged against the outer edge of the lower piezoelectric element 2.

Figure 10:
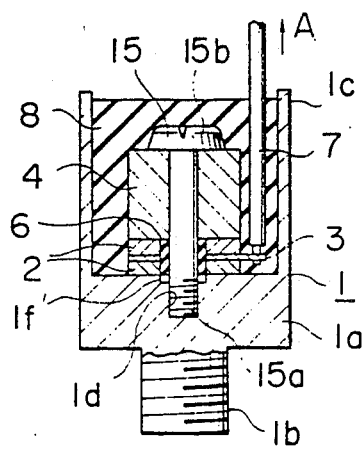
FIG. 10 is a sectional side view of the acceleration detector of a still another embodiment of the present invention.

FIG. 10 illustrates a further embodiment of the present invention in which the threaded hole 1d formed in the base 1a of the housing 1 has a counter sink 1f for providing a predetermined dimensional allowance in the relationship between the axial length of the threaded portion 15a of the mounting screw 15 and the depth of the threaded hole 1d in the base 1a. This arrangement allows a slight deviation of the actual axial length of the threaded portion 15a from the designed dimension to be accommodated in the depth of the counter sunk 1f.

As has been described, according to the present invention, the axial length of the threaded portion of the mounting screw is selected such that its substantially entire length engages the threaded hole in the housing in order not to damage an electrically insulating tube placed over the screw by the thread on the screw. The threaded hole in the base may have a counter sink for providing a predetermined dimensional allowance in the relationship between the axial length of the threaded portion and the depth of the thread hole. Also, the terminal may have a bent tab at the outer circumference of the ring-shaped eye portion for engaging the outer circumferential surface of at least one of the piezoelectric elements to prevent the terminal from being displaced relative to the piezoelectric elements.

Therefore, even when the output terminal is pulled in the radial direction toward the insulating tube by the lead wire during the assembly of the acceleration detector, the insulating tube is not pressed hard against the thread of the mounting screw because of the engagement tab formed on the terminal. Even with the arrangement in which no engagement tab is provided on the output terminal, the portion of the stem of the mounting screw against which the insulating tube is pressed has no thread, so that the insulating tube is not damaged by the screw thread, whereby the piezoelectric elements can be prevented from being short-circuited and reliability of the acceleration detector is increased. Also, since the threaded portion of the mounting screw is relatively short, additional time and cost for forming unnecessary thread are not needed.

What is claimed is:

1. An acceleration detector comprising:
   ring-shaped piezoelectric elements;
   a terminal having a ring-shaped eye portion disposed between said piezoelectric elements for taking out an output from said piezoelectric elements;
   a weight for applying a stress to said piezoelectric elements in response to an acceleration applied to the detector;
   a base capable of being secured to an object of which acceleration is to be detected;
   a mounting screw extending through said piezoelectric elements, said terminal and said weight for mounting them to said base; and
   an electrically insulating tube placed over said mounting screw for insulating said mounting screw from said piezoelectric elements and said terminal;
   said terminal having a bent tab at the outer circumference of said ring-shaped eye portion for engaging the outer circumferential surface of at least one of said piezoelectric elements.

2. An acceleration detector as claimed in claim 1 wherein said terminal has a plurality of said bent tabs.

3. An acceleration detector comprising:
   ring-shaped piezoelectric elements;
   a terminal having a ring-shaped eye portion disposed between said piezoelectric elements for taking out an output from said piezoelectric elements, said terminal having a bent tab at the outer circumference of said ring-shaped eye portion for engaging the outer circumferential surface of at least one of said piezoelectric elements;
   a weight for applying a stress to said piezoelectric elements in response to an acceleration applied to the detector;
   a base having a threaded hole and capable of being secured to an object of which acceleration is to be detected;
   a mounting screw extending through said piezoelectric elements, said terminal and said weight, said mounting screw having a threaded portion thread-engaged with said threaded hole of said base for mounting said piezoelectric elements, said terminal and said weight to said base; and
   an electrically insulating tube placed over said mounting screw for insulating said mounting screw from said piezoelectric elements and said terminal;
   said threaded portion of said mounting screw thread-engaging at its substantially entire length with said base.

4. An acceleration detector as claimed in claim 3 wherein said base has formed therein a counter sink about said threaded hole for providing a predetermined dimensional allowance in the relationship between the axial length of said threaded portion and the depth of said thread hole.

* * * * *